Patented Jan. 2, 1934

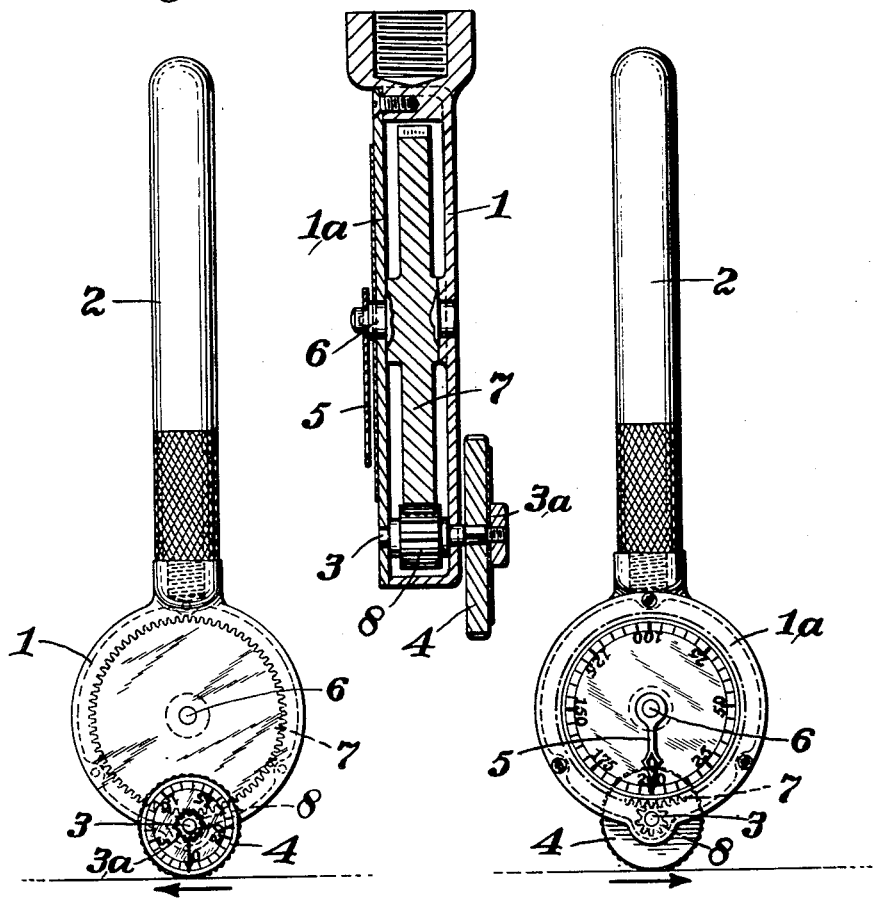
Fig.1. Fig.3. Fig.2.
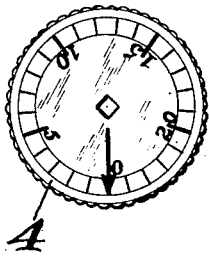
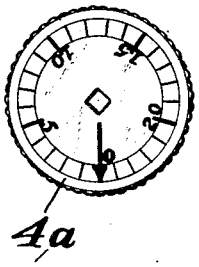
Fig.4. Fig.5. Fig.6.
Inventor:
Byron E. Woodcock,
Attys.

1,942,130

UNITED STATES PATENT OFFICE 1,942,130

AUTOMOBILE MAP MILEAGE INDICATOR

Byron E. Woodcock, Scranton, Pa.

Application August 22, 1930. Serial No. 477,135

2 Claims. (Cl. 33—141)

My present invention relates to an improved device for determining the distance between cities and other points on automobile route maps, and aims to provide a device which will be simple, economical of construction, easily carried in the pocket or other readily accessible place, and which may be used to determine quickly and accurately the distance between any two given points on a map by merely causing a traction wheel carried by the device to roll over the surface of the map along the route between said points. A further object is to provide a device which may be readily converted to adapt it to maps of different scales.

To these ends the invention includes the novel device hereinafter described and defined by the appended claims.

An embodiment of the invention is illustrated in the accompanying drawing in which Figure 1 is a side elevation of one side of the device, Fig. 2 is a view of the opposite side, Fig. 3 is an enlarged vertical section through the instrument, Figs. 4, 5 and 6 are detail views of traction wheels of different sizes.

According to my invention I provide a suitable frame, casing or body having spaced apart parallel side walls 1 and 1a and a suitable manipulating handle 2. A small shaft 3 is rotatably journaled in said walls at a suitable point adjacent the edge as indicated in the drawing, which shaft is provided with a traction wheel 4 fast thereon, having a narrow and preferably milled edge, located on a portion of the shaft which projects outside the casing, and which wheel is adapted to have its edge rolled along the map following and in contact with the route line indicated thereon. Said wheel is of a circumference corresponding to the scale on which the map is drawn and has its face provided with graduations in miles.

In the drawing the wheel is shown as provided with annular scale marks for twenty-five miles, the arrangement being such that if the traction wheel is caused to travel over a route from one point to another, the traction wheel will itself show the distance if such distance does not exceed twenty-five miles.

For conveniently indicating great distances I provide an annular scale on one face or side wall of the casing graduated to indicate mileage up to two hundred miles as shown in the drawing and which I consider sufficient for practical purposes. A pointer 5 cooperates with this scale, which is fast on a shaft 6 driven by a train of gearing from the traction wheel. In the embodiment shown in the drawing this train of gearing comprises a spur gear wheel 7 fast on the shaft 6 meshing with a small spur gear 8 fast on shaft 3, the ratio of the gearing being such that when the shaft 3 has rotated according to a certain mileage the pointer will have traveled a commensurate distance and indicate a corresponding mileage. Road maps are drawn to various scales, there being certain definite scales in common use.

To enable my device to be used with maps of various scales I provide a plurality of removable and interchangeable traction wheels. These may be selectively applied to the shaft 3 and removably held thereon by a nut 3a or by analogous means. For illustrative purposes I have shown three wheels.

That designated 4 in Figs. 1, 2, 3 and 4 is of such circumference that when rolled along a route on the 1930 Penn. State highway map for a complete rotation it will correspond exactly to twenty-five miles on the map when the scale is 10 miles to the inch.

Wheel 4a, Fig. 5, has a circumference corresponding to a commonly used A. A. A. map with a scale of 11 miles to the inch, while wheel 4b, Fig. 6, has a circumference corresponding to another commonly used A. A. A. map with a scale of 29 miles per inch.

Obviously any number of wheels can be furnished as map scales require, and the wheels may be provided with scale indications to enable ready selection. The scales of the traction wheels 4, 4a and 4b, which are adapted to respectively measure a similar distance on their respective maps, are located on the outer or front faces of the wheels, and the nut 3a for securing the selected traction wheel to the shaft 3 is wholly located radially inward of the scale on the traction wheel, so as to permit the scale to be conveniently read. The handle 2 extends from the casing diametrically opposite the axis of the traction wheel so as to enable the device to be readily supported and turned on the traction wheel, and thus enable the traction wheel to be easily directed along any curved or straight line of a map. The train of gearing operated by the traction wheel consists of but two spur gears, to the end that an exceptionally thin casing may be used. The thinness of the casing, the length and diameter of the handle, and the diameter of the traction wheel, are such as to provide a measuring device of such small size as to adapt it to be conveniently carried in the pocket.

It will be obvious that whichever traction wheel is used, if rolled along the map of corresponding scale, the pointer 5 will always indicate the correct mileage.

Having thus described my invention what I claim is:

1. A device for measuring distances on scale drawn maps, comprising a pointer and an annular scale, a casing of shallow, cylindrical formation carrying one of said first parts, a train of gearing in the casing consisting solely of two different size spur gears, the larger of said gears being rotatably mounted in the casing and carrying the other of said first parts, a small shaft journaled in the lower side of the casing and having the smaller of said gears fixed thereto, the shaft extending outwardly beyond the casing, a traction wheel, means on said shaft upon which the traction wheel may be selectively secured and whereby traction wheels of different diameters may be selectively secured to said shaft to adapt the device for use with maps drawn to different scales, the traction wheel being provided on its outer face with an annular scale adapted to indicate distances, said first scale and the scales of the respective traction wheels being adapted respectively to be used to measure long and short distances on a map, means for removably securing the traction wheel to the shaft, said means being wholly located radially inward of the scale of the traction wheel so as not to obstruct the scale, and a handle extending radially from the upper side of the casing diametrically opposite the axis of the traction wheel.

2. A device for measuring distances on scale drawn maps, comprising a pointer and an annular scale, a casing carrying one of said first parts, a gear journaled in the casing carrying the other of said first parts, a shaft journaled in the casing and having a portion extending outwardly beyond the casing, a gear fixed to said shaft within the casing and meshing with said first gear, a traction wheel, means on said shaft upon which the traction wheel may be selectively secured and whereby traction wheels of different diameters may be selectively secured to said shaft to adapt the device for use with maps drawn to different scales, the traction wheel being provided on its outer face with an annular scale adapted to indicate distances, and means for removably securing the traction wheel to the shaft, said means being confined to the center of the traction wheel so as not to obstruct the scale thereon.

BYRON E. WOODCOCK.